(12) United States Patent  
van Nieuwstadt et al.

(10) Patent No.: US 6,269,633 B1  
(45) Date of Patent: Aug. 7, 2001

(54) EMISSION CONTROL SYSTEM

(75) Inventors: Michiel Jacques van Nieuwstadt, Ann Arbor; Fazal Urrahman. Syed, Canton; John H. Vanderslice, Berkley; Siamak Hashemi, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/521,395

(22) Filed: Mar. 8, 2000

(51) Int. Cl.$^7$ ....................................... F01N 3/00
(52) U.S. Cl. ............... 60/277; 60/286; 60/295; 60/301
(58) Field of Search ............... 60/286, 295, 277, 60/301, 303

(56) References Cited

U.S. PATENT DOCUMENTS

| | | | |
|---|---|---|---|
| 5,201,802 | * 4/1993 | Hirota et al. | 60/301 |
| 5,233,934 | 8/1993 | Krigmont et al. | |
| 5,272,871 | * 12/1993 | Oshima et al. | 60/286 |
| 5,365,734 | 11/1994 | Takeshima . | |
| 5,369,956 | 12/1994 | Daudel et al. . | |
| 5,412,946 | * 5/1995 | Oshima et al. | 60/286 |
| 5,426,934 | * 6/1995 | Hunt et al. | 60/277 |
| 5,479,775 | * 1/1996 | Kraemer et al. | 60/285 |
| 5,628,186 | 5/1997 | Schmelz . | |
| 5,845,487 | 12/1998 | Fraenkle et al. . | |
| 5,910,096 | * 6/1999 | Hepburn et al. | 60/286 |
| 5,921,076 | * 7/1999 | Krutzsch et al. | 60/286 |
| 6,122,909 | * 9/2000 | Murphy et al. | 60/286 |
| 6,122,910 | * 9/2000 | Hoshi et al. | 60/286 |
| 6,125,629 | * 10/2000 | Patchett | 60/286 |
| 6,182,444 | * 2/2001 | Fulton et al. | 60/277 |

FOREIGN PATENT DOCUMENTS

355093917 * 7/1980 (JP) .
403229910 * 10/1991 (JP) .

* cited by examiner

Primary Examiner—Thomas Denion  
Assistant Examiner—Diem Tran  
(74) Attorney, Agent, or Firm—Jerome R. Drouillard

(57) ABSTRACT

An engine exhaust aftertreatment system is described in which lean $NO_x$ exhaust aftertreatment devices are employed. Because temperature in the exhaust line varies as a function of distance from the engine and engine operating condition, exhaust aftertreatment devices are situated along the exhaust line to ensure that at least one of said exhaust aftertreatment devices operates at a temperature of high $NO_x$ conversion efficiency. Reductant quantity is scheduled by the engine's control unit to be supplied to the exhaust aftertreatment devices based on available information provided by sensors or embedded engine control unit models, including: temperature in the exhaust aftertreatment devices, available reductant in the exhaust stream, reductant storage in the exhaust aftertreatment devices, maximum adsorption capacity of the exhaust aftertreatment devices, engine operating conditions, and $NO_x$ concentration.

11 Claims, 4 Drawing Sheets

EMISSION CONTROL SYSTEM

FIELD OF THE INVENTION

The invention relates to a system and method for controlling injection of exhaust stream additive into the exhaust stream of an internal combustion engine to ensure high overall $NO_x$ conversion efficiency of an exhaust aftertreatment system.

BACKGROUND OF THE INVENTION

Current automotive emission regulations necessitate the use of exhaust aftertreatment devices. Oxides of nitrogen ($NO_x$), for example, can be reduced to nitrogen and water in a selective catalyst reduction device using externally added reducing agents. $NO_x$ conversion in a three-way catalyst operating at stoichiometric air-fuel ratio is commonly greater than 95%. Such high conversion $NO_x$ efficiencies have not been demonstrated in practice in engines in which the exhaust stream is leaner than stoichiometric. Diesel engines and lean gasoline engines operate lean and cannot, therefore, realize the high $NO_x$ conversion efficiencies of three-way catalysts.

Exhaust aftertreatment devices for use in lean operating engine systems tend to have a narrow temperature range in which $NO_x$ is converted efficiently, compared to a three-way catalyst. Furthermore, lean exhaust aftertreatment devices require that a quantity of reducing material, eg., fuel or ammonia, be present in proportion to the amount of $NO_x$ to be reduced. In U.S. Pat. No. 5,628,186 a method is disclosed in which a reductant is supplied to the exhaust stream of an engine based on output from a sensor in the exhaust line. Optionally, an $NO_x$ sensor can be located in the exhaust line to refine the method. U.S. Pat. No. 5,628,186 does not overcome the narrow temperature range difficulty with lean exhaust aftertreatment devices. In the present invention, two exhaust aftertreatment devices are employed: one in the exhaust line closer to the engine and at least one more downstream in the exhaust line. Because the temperature in the exhaust line decreases along its length, the temperatures in the exhaust aftertreatment devices are dissimilar providing an opportunity for selectively using only a device operating in the appropriate temperature range for acceptable $NO_x$ conversion.

U.S. Pat. No. 5,845,487 discloses a method in which two modes of operation are employed depending on the operating condition of the engine. In a first mode, injection timing is retarded which results in low feedgas $NO_x$ concentration and a penalty in fuel economy. In the second mode, injection timing is advanced which results in a fuel economy improvement at the cost of higher feedgas $NO_x$. Exhaust stream additive is injected in the latter mode to effect reduction of $NO_x$ in an exhaust aftertreatment device. Retarding injection timing hurts fuel economy. An advantage of the present invention is that it increases the effective window of exhaust gas temperature over which acceptable $NO_x$ conversion efficiency occurs thereby eliminating or limiting the need for fuel inefficient measures as retarding injection timing.

Other strategies have been devised in which engine operating condition is altered in pursuit of exhaust gas temperatures suitable for high $NO_x$ conversion efficiency. It is obvious to one skilled in the art that such measures lead to degradation in fuel economy, driveability, emission control of other pollutants, or a combination thereof. Even if these disadvantages could be overcome, the engine control unit must manage the engine such that a switch between desired operating condition and an engine control point for $NO_x$ reduction is imperceptible to the vehicle operator. The method and apparatus of the present invention overcome these disadvantages by improving the effective temperature window of acceptable $NO_x$ conversion efficiency.

U.S. Pat. No. 5,365,734 discloses a system which employs a plurality of lean NOx catalysts and exhaust conduits. The system includes valve(s) to divert the exhaust flow, with the desired outcome of controlling the space velocity in each of the catalysts to provide high conversion efficiency. A system according to the present invention, in contrast, improves upon U.S. Pat. No. 5,365,734 in that diverting valves and multiple exhaust ducts are not required for handling the exhaust stream. It is known in the art that exhaust ducts are harsh environments in which to place moving parts, such as a valve, which must provide robust and long-lived service. Furthermore, the present invention bases the control of active exhaust aftertreatment devices on temperature, instead of space velocity, as is the case of in U.S. Pat. No. 5,365,734.

U.S. Pat. No. 5,369,956 discloses a system employing an ammonia sensor downstream of the exhaust aftertreatment device in which the supply of exhaust stream additive is controlled so as to avoid breakthrough, i.e., exhausting unreacted ammonia. The present invention provides three advantages: an exhaust stream additive sensor is not required; exhaust stream additive is supplied to provide high $NO_x$ conversion efficiency, as opposed to merely preventing breakthrough; and, supply of exhaust stream additive is altered based on operating temperature, again to provide best $NO_x$ conversion efficiency.

A method is disclosed in U.S. Pat. No. 5,233,934 in which two catalysts are employed in the flue gases from a burner using $NO_x$ and ammonia sensors. Ammonia slip and $NO_x$ emissions are regulated by using nitrous oxide sensors to detect a nitrous oxide concentration. Then, the amount of nitrous oxide is optimized while maintaining ammonia slip below a threshold value. The optimization is achieved by varying reductant injection until the minimum value of nitrous oxide as measured by the sensor is obtained. The amount of reductant injected to locate and achieve this minimum is limited by a measurement of ammonia slip from an ammonia sensor. U.S. Pat. No. 5,233,934 requires feedback control optimization on sensor signals in the exhaust line which provide a delayed signal due to the transit time in the exhaust line. In the case of a burner, operating conditions are constant for long periods of time and may be changed slowly mitigating this disadvantage. However, internal combustion engines, particularly those used in transportation, must react quickly to operator demands. The present invention does not use an optimization procedure and uses an engine model instead. Also, the present invention does not depend on exhaust gas sensors; but, if present, they can be used to refine the engine model.

SUMMARY OF THE INVENTION

An object of the invention claimed herein is to provide an exhaust aftertreatment system which includes a plurality of exhaust aftertreateament devices and the control algorithm to optimize the system for overall $NO_x$ conversion efficiency of the system. Because temperature in the exhaust line is a function of the operating condition of the engine, judicious placement of the exhaust aftertreatment devices ensures that the temperature of at least one of the exhaust aftertreatment devices is within the range which provides acceptable $NO_x$ conversion efficiency. An advantage of the present invention is that by placing exhaust aftertreatment devices at several locations along the exhaust line, exhaust aftertreatment system efficiency is optimized lessening the need for invasive, efficiency reducing measures to control exhaust gas temperature.

Conversion of $NO_x$ to $N_2$ and $O_2$ requires that an appropriate ratio of reductant to $NO_x$, as a function of temperature and space velocity, be maintained. An exhaust stream additive supply and a metering system are required. The exhaust stream additive may be hydrocarbons, urea, or other suitable reductant. The engine control unit schedules addition of exhaust stream additive to supply each of the exhaust aftertreatment devices. Input data to said engine controller used to compute exhaust stream additive quantity may include engine operating conditions (e.g., temperatures, rpm, air flowrate), exhaust aftertreatment device temperatures, and $NO_x$, hydrocarbon, and exhaust stream additive concentrations at the inlet to each exhaust aftertreatment device. Temperature and concentration information may be modelled based on engine operating conditions or measured by sensors. Temperature and concentration information can be used to update said engine control unit's exhaust aftertreatment system model.

A method for controlling the delivery of exhaust stream additive includes calculating which exhaust aftertreatment devices are in a temperature operating range of acceptable conversion efficiency and, thus, should be scheduled to receive exhaust stream additive. The amount of exhaust stream additive to be supplied to each scheduled aftertreatment device is computed based on the desired ratio of exhaust stream additive to $NO_x$. Hydrocarbons or other reducing feedgas constituents lessen the need for exhaust stream additive. Thus, exhaust stream additive to be supplied is decreased in proportion to said reducing feedgas constituents. Finally, said exhaust stream additive supply devices are commanded to deliver said computed quantity. A maximum allowable amount of exhaust stream additive can be used to limit exhaust stream additive.

Other factors which may be handled in said engine control unit's algorithm for computing exhaust stream additive delivery are exhaust stream additive absoprtion maximum of each exhaust aftertreatment device and maximum allowable exhaust stream additive to supply due to exhaust aftertreatment device degradation. Said exhaust aftertreatment device degradation may be based on the integral of exhaust gas temperature with respect to time entering said exhaust aftertreatment. Exhaust aftertreatment device storage, desired exhaust stream additive ratio, and $NO_x$ conversion rates are modified based on said exhaust aftertreatment device degradation.

Any of exhaust temperature, exhaust stream additive, or $NO_x$ sensors may be placed in the exhaust line to provide information which may be used by the engine control unit's internal exhaust system model. Such data could be used to adapt the system model. Herein, adapt means altering exhaust system model constants to reduce the error between model estimations and data acquired from sensors.

An exhaust aftertreatment system for an internal combustion engine includes a first fluid supply device for supplying an exhaust stream additive into exhaust gases flowing from the internal combustion engine through an exhaust line and a first exhaust aftertreatment device located in the exhaust line downstream of said first exhaust stream additive supply device. The system also comprises at least one additional exhaust aftertreatment device located in the exhaust line downstream of the first exhaust aftertreatment device and at least one additional fluid supply device for supplying an exhaust stream additive to said exhaust gases upstream of said additional exhaust aftertreatment device(s). The system further includes at least one sensor for providing signals from which engine air flow can be computed by an engine control unit and an engine control unit for scheduling the supply of exhaust stream additive to said first and additional exhaust aftertreatment devices at a rate determined from a plurality of engine and exhaust system operating characteristics.

A method to be disposed in an engine control unit for metering exhaust stream additive to more than one exhaust aftertreatment device in an exhaust aftertreatment system includes the steps of determining the temperature of a first exhaust aftertreatment device and any other exhaust aftertreatment devices and determining which exhaust aftertreatment devices are at temperatures at which conversion efficiency is sufficient alone or as a system with other exhaust aftertreatment devices and should thus be scheduled to receive exhaust stream additive. The method further includes steps for computing desired exhaust stream additive ratio, that is, the ratio between exhaust stream additive to $NO_x$, for each exhaust aftertreament device scheduled to receive exhaust stream additive and using said desired exhaust stream additive ratio and feedgas composition to compute exhaust stream additive quantity to supply to each exhaust aftertreatment device. The method further includes the steps of determining the quantity of hydrocarbon and other reducing species in the exhaust gas stream, decreasing exhaust stream additive quantity to each scheduled exhaust aftertreatment device to account for the reducing action of reducing species at inlet to each scheduled exhaust stream device, and using exhaust stream additive quantity to supply to each exhaust aftertreatment device to command supply by the exhaust stream additive injectors.

A method for controlling delivery of exhaust stream additive to an exhaust aftertreatment system with more than one exhaust aftertreatment device coupled to an automotive engine, includes the steps of computing the quantity of $NO_x$ and reducing species constituents of engine feedgas, computing desired exhaust stream additive ratio, that is, the ratio between exhaust stream additive to $NO_x$, for a first exhaust aftertreatment device to achieve high exhaust system conversion efficiency in the first exhaust aftertreatment device, computing exhaust stream additive quantity which must be injected from an exhaust stream additive supply into the exhaust stream entering the first exhaust aftertreatment device such that desired exhaust stream additive ratio is attained, and decreasing the quantity of exhaust stream additive to account for the reducing ability of feedgas constituents. The method further includes the steps of computing the amount of $NO_x$ exiting said first exhaust aftertreatment device based on $NO_x$ entering the first exhaust aftertreatment device less the amount converted in the first exhaust aftertreatment device, computing the quantity of reducing species exhausted from the first exhaust aftertreatment device, computing the desired exhaust stream additive ratio for a second exhaust aftertreatment device to achieve high exhaust system conversion efficiency, computing the quantity of exhaust stream additive which must be injected from the exhaust stream additive supply into the exhaust stream entering the second exhaust aftertreatment device such that the desired exhaust stream additive ratio is attained, decreasing the quantity of exhaust stream additive to supply to the second exhaust aftertreatment device to account for the reducing ability of feedgas constituents to the second exhaust aftertreatment device, and commanding exhaust stream additive injectors to supply exhaust stream additive.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENTS

Figure 1:
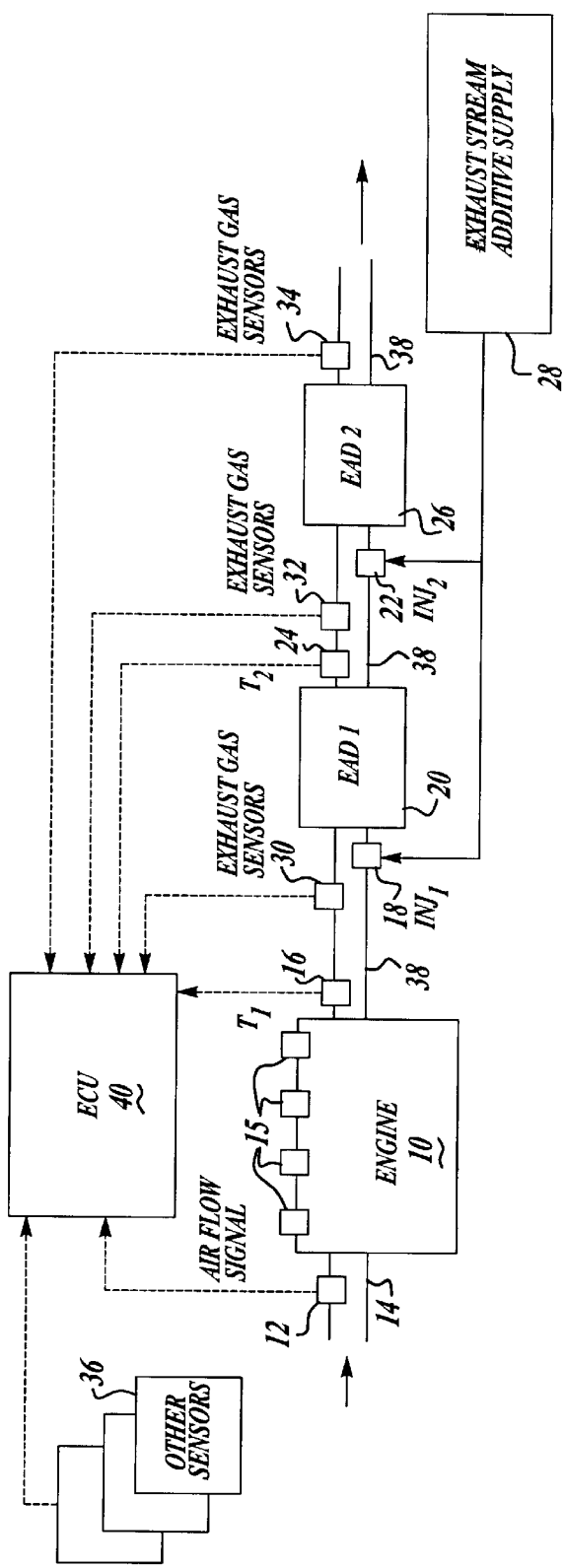
FIG. 1 is a block diagram of an embodiment wherein the invention is used to advantage.

Internal combustion engine 10, as shown in FIG. 1, is controlled by electronic engine control unit (ECU) 40. Engine 10 includes intake system 14 into which sensor 12 is placed. Sensor(s) 12 provides a signal(s) to ECU 40 from which air mass flow rate can be computed. Fuel for engine 10 is supplied and metered by fuel injectors 15. Said fuel injectors 15 could be in-cylinder or port injectors. Exhaust products are removed from engine 10 via exhaust line 38. Temperature sensor 16 in exhaust line 38 placed downstream of engine 10 provides a signal to the ECU 40 of the exhaust gas temperature. Exhaust gas sensors 30 provide signals of HC and NOx concentrations to the ECU 40. A first injector 18 supplies reductant to exhaust aftertreatment device 20 and is located upstream of said exhaust aftertreatment device 20 and downstream of the exhaust gas sensors 30. Said first injector 18 is supplied by an exhaust stream additive supply 28. A second temperature sensor 24 and exhaust gas sensors 32 are located downstream of exhaust aftertreatment device 20. A second injector 22 supplies reductant to exhaust aftertreatment device 26 and is located upstream of said exhaust aftertreatment device 26. Exhaust gas sensors 34 are located downstream of said exhaust aftertreatment device 26.

Temperature sensors (16 and 24) and exhaust gas sensors (30, 32, and 34) are optional because an engine and exhaust system model in the ECU 40 or a lookup table in the ECU 40 could be used to estimate temperatures and exhaust gas constituent concentrations based on engine operating conditions. Alternatively, temperature sensors (16 and 24) and exhaust gas sensors (30, 32, and 34) can be used in combination with ECU models or lookup tables to improve the accuracy of the control scheme or can be used to refine ECU models or lookup tables as the exhaust aftertreatment system ages.

One skilled in the art will appreciate that said exhaust stream additive may be fuel or materials such as urea or hydrocarbons other than the type used in the main supply to the engine. If the exhaust stream additive is fuel and fuel injectors 15 are mounted in-cylinder, said first injector 18 may be supplanted by fuel injectors 15 which can supply fuel to the post combustion gases for use in exhaust aftertreatment device 20.

Figure 2:
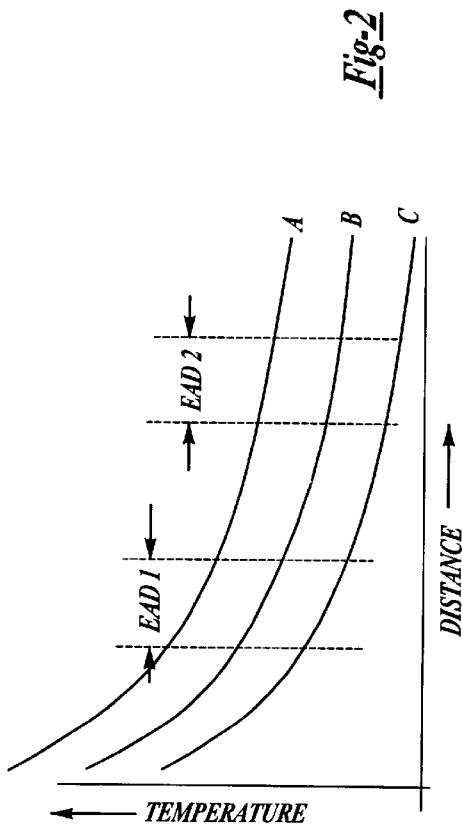
FIG. 2 is a graph which indicates the temperature profile in the exhaust system at a range of engine operating conditions.

In FIG. 2, exhaust gas temperature as a function of distance down the exhaust line 38 is shown for three operating conditions: high output (A), medium output (B), and low output (C). The temperatures for said first and second exhaust aftertreatment devices (20 and 26), configured as in FIG. 1, are shown between dotted lines in FIG. 2. Clearly, said second exhaust aftertreatment device 26 experiences lower exhaust gas temperatures than said first exhaust aftertreatment device 20.

Figure 3:
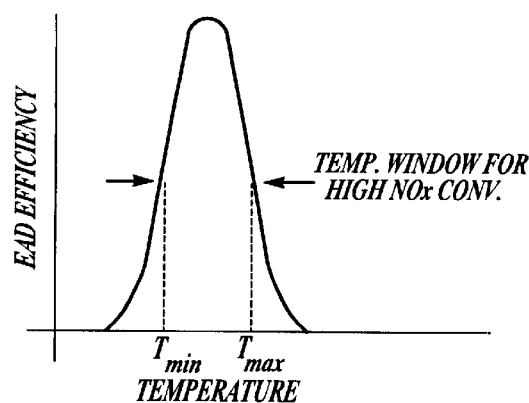
FIGS. 3–5 are graphs showing the exhaust aftertreatment conversion efficiency as temperature is varied, as composition of the exhaust gases are varied, and for the combination of two exhaust aftertreatment devices.

FIG. 3 shows exhaust aftertreatment device conversion efficiency as temperature is varied. Outside a temperature range of $T_{min}$ and $T_{max}$, exhaust aftertreatment device conversion efficiency is too low to be viable in practice.

Figure 4:
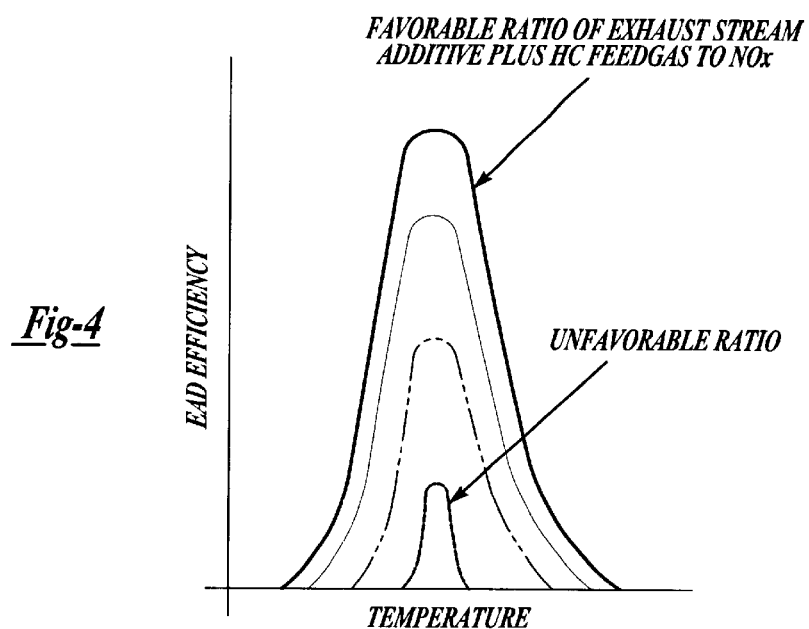

FIG. 4 shows that exhaust aftertreatment device conversion efficiency is sensitive to the constituents in the exhaust stream. For $NO_x$ conversion, a suitable reductant, i.e., exhaust stream additive, in a proportion appropriate for the operating conditions and $NO_x$ feedgas concentration must be available in said exhaust aftertreatment device. As with temperature, practical viability of said exhaust aftertreatment device depends on maintaining the appropriate proportion of constituents to allow reasonable conversion efficiency.

Figure 5:
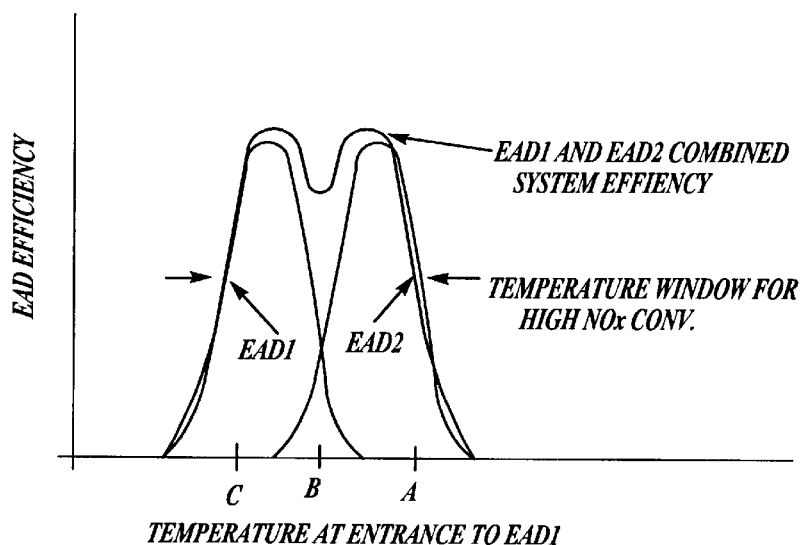

FIG. 5 shows the combined system efficiency for the present invention in which two exhaust aftertreatment devices are placed in the exhaust system. The conversion efficiencies of said first and second exhaust aftertreatment devices are shown as a function of the inlet temperature to said first exhaust aftertreatment device. The overall efficiency for combining said exhaust aftertreatment devices is shown as the dotted line in FIG. 5. High conversion efficiency is maintained over a wider temperature range than either exhaust aftertreatment device singly. Temperature A in FIG. 5, corresponding to engine condition A of FIG. 2, results in a situation where no appreciable conversion occurs in the first exhaust aftertreatment device. In such a case, exhaust stream additive would not be supplied to said first exhaust aftertreatment device. The opposite is true for temperature C in FIG. 5 in which exhaust stream additive would not be supplied to the second exhaust aftertreatment device. Temperature B is a condition at which neither said first or second exhaust aftertreatment devices is at high efficiency. However, the two exhaust aftertreatment devices in series results in high combined efficiency. For this case, exhaust stream additive would be supplied to both exhaust aftertreatment devices.

Figure 6:
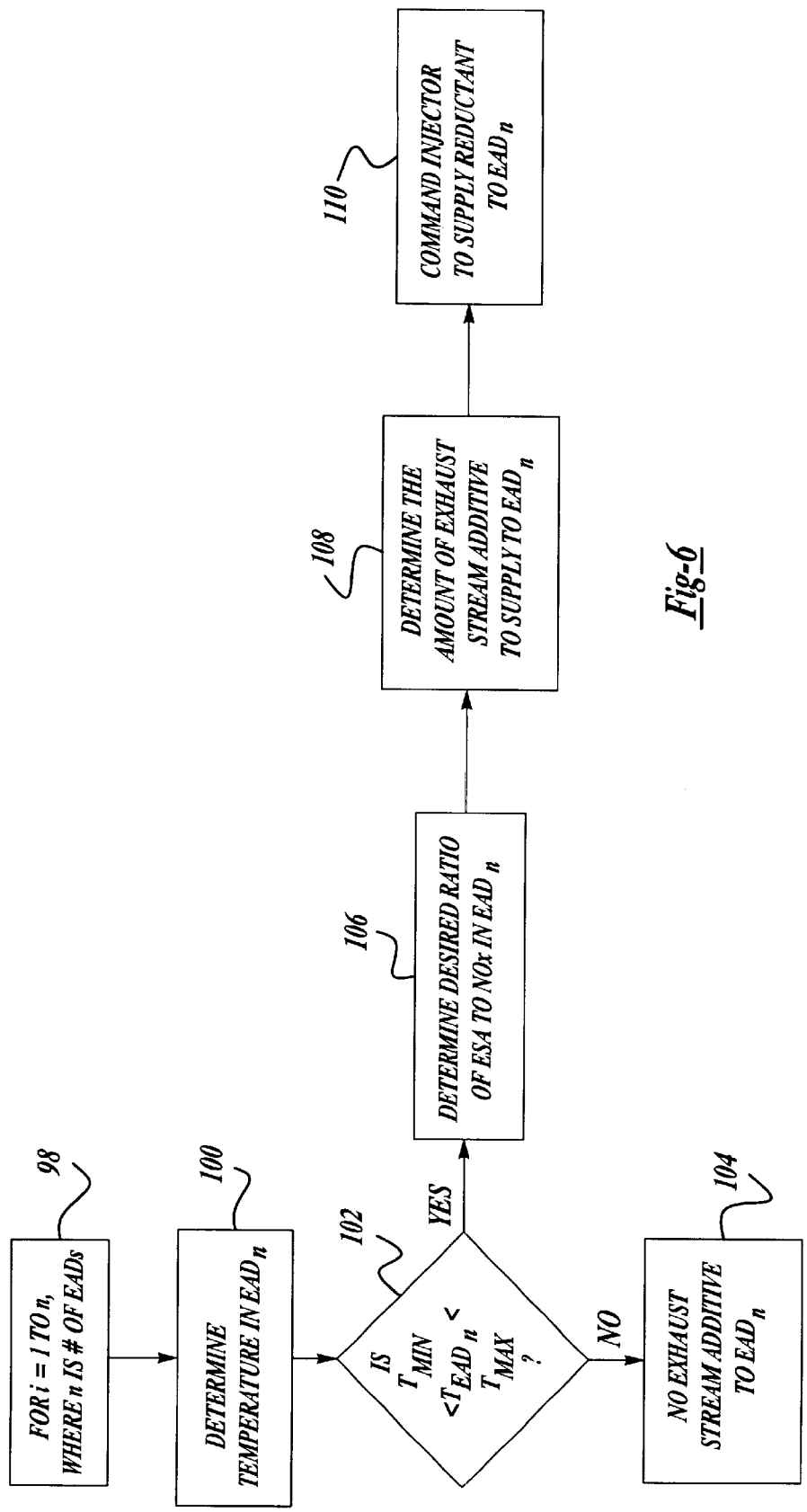
FIGS. 6–7 are high level flow charts of various operations performed by the embodiment shown in FIG. 1.

FIG. 6 shows a flowchart which would be executed in the ECU 40 to command the appropriate supply of exhaust stream additive to exhaust aftertreatment devices (EADs). As the flowchart of FIG. 6 is carried out for each exhaust aftertreatment device, step 98 sets up a loop to execute the following steps n times, where n is the number of aftertreatment devices in said system. Temperatures in the exhaust aftertreatment devices are determined in step 100. Next, the temperature is compared to $T_{min}$ and $T_{max}$ in step 102. If exhaust aftertreatment device temperature is outside $T_{min}$ and $T_{max}$ window, no exhaust stream additive is supplied, step 104. If said exhaust aftertreatment device temperature is within $T_{min}$ and $T_{max}$ window, the desired ratio of exhaust stream additive to $NO_x$ for said exhaust aftertreatment device is computed in step 106. Next, the amount of exhaust stream additive to supply to said exhaust aftertreatment device is computed in step 108. Said calculation takes into account the feedgas constituent, e.g., hydrocarbon acting as a reductant presence of hydrocarbons lessens the quantity of exhaust stream additive which must be supplied. Said calculation further takes into account the adsorption and desorption of exhaust stream additive and hydrocarbon species from exhaust aftertreatment device surfaces.

It can be appreciated by one skilled in the art that $T_{min}$ and $T_{max}$ of FIGS. 3 and 6 are not fixed quantities. They may be varied based on engine operating conditions, desired overall system response, are degradation characteristics of said exhaust aftertreatment system, among others.

Figure 7:
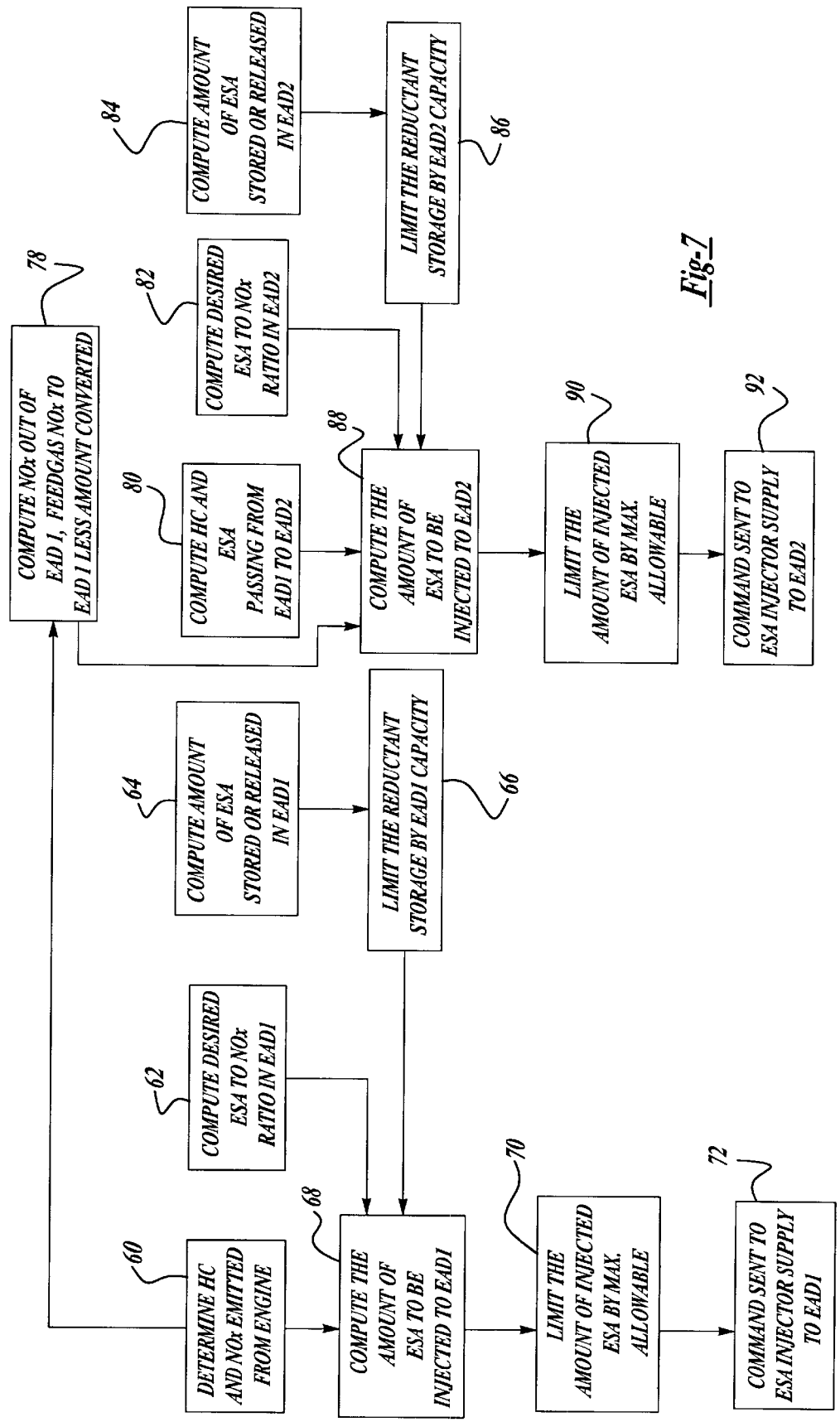

FIG. 7 illustrates the steps required to determine the amount of exhaust stream additive to supply to each of said exhaust aftertreatment devices. In step 60, the amount of hydrocarbon and $NO_x$ exhausted from the engine is determined. Either exhaust sensor 30 signals, an engine model in the ECU 40, or a combination of the two methods are used to determine said hydrocarbon and $NO_x$ concentrations in feedgas from said engine. Independently, the desired exhaust stream additive (ESA) to $NO_x$ ratio for said first exhaust aftertreatment device is computed in step 62. In a further independent step 64, the amount of ESA stored and released is computed based on engine operating conditions and known adsorption/desorption characteristics of said exhaust aftertreatment device and chemical species in said ESA. Adsorption of said first exhaust aftertreatment device is limited by its capacity; said limit is enforced in step 66. In step 68, the results of steps 60, 62, and 66, sources and sinks of ESA, are used to compute the amount of ESA to supply to said first exhaust aftertreatment device. In step 70, the amount of ESA added is limited to reflect known allowable maximum based on said exhaust aftertreatment capacity, degradation, and malfunction characteristics. Said limited ESA quantity is commanded to ESA supply injector in step 72. If ESA is fuel, in-cylinder injector or injectors 15 may be used to supply ESA to post-combustion gases. If ESA is not fuel, injector 18 supplies ESA.

The procedure for supplying ESA to said second exhaust aftertreatment device begins with steps 78 and 80, in which the $NO_x$, hydrocarbon, and ESA as feedgas to said second exhaust aftertreatment device are computed. Steps 82 through 92 applied to said second exhaust aftertreatment device are identical to steps 62 through 72 described above for said first exhaust aftertreatment device. To one skilled in the art, it should be obvious that if no ESA is exhausted from said first aftertreatment device, step 80 requires computation of hydrocarbon quantity only.

What is claimed is:

1. A method for controlling delivery of exhaust stream additive to an exhaust aftertreatment system with more than one exhaust aftertreatment device coupled to an automotive engine, comprising the steps of:

computing the quantity of $NO_x$ and reducing species constituents of engine feedgas;

computing desired exhaust stream additive ratio, that is, the ratio between exhaust stream additive to $NO_x$, for a first exhaust aftertreatment device to achieve high exhaust system conversion efficiency in said first exhaust aftertreatment device;

computing exhaust stream additive quantity which must be injected from an exhaust stream additive supply into the exhaust stream entering said first exhaust aftertreatment device such that said desired exhaust stream additive ratio is attained;

decreasing said quantity of exhaust stream additive to account for the reducing ability of feedgas constituents;

computing the amount of $NO_x$ exiting said first exhaust aftertreatment device based on $NO_x$ entering said first exhaust aftertreatment device less the amount converted in said first exhaust aftertreatment device;

computing the quantity of reducing species exhausted from said first exhaust aftertreatment device;

computing said desired exhaust stream additive ratio for a second exhaust aftertreatment device to achieve high exhaust system conversion efficiency;

computing the quantity of exhaust stream additive which must be injected from said exhaust stream additive supply into the exhaust stream entering said second exhaust aftertreatment device such that said desired exhaust stream additive ratio is attained;

decreasing said quantity of exhaust stream additive to supply to said second exhaust aftertreatment device to account for the reducing ability of feedgas constituents to said second exhaust aftertreatment device;

and commanding the exhaust stream additive injectors to supply said exhaust stream additive.

2. A method according to claim 1, further comprising the step of accounting for exhaust stream additive which is adsorbed in and desorbed from any of said exhaust aftertreatment devices.

3. A method according to claim 1, further comprising the step of accounting for maximum exhaust stream additive storage capacity of said exhaust aftertreatment devices considered as a system.

4. A method according to claim 1, further comprising the step of computing said desired exhaust stream additive ratio as a function of any of the following: engine operating conditions, space velocity, and exhaust aftertreatment device temperature.

5. A method according to claim 1, further comprising the step of limiting the computed amount of exhaust stream additive to be injected into the exhaust gases being supplied to said exhaust aftertreatment devices by a known maximum allowable amount.

6. A method according to claim 1, further comprising the step in which exhaust aftertreatment device degradation is computed based on the integral of temperature of exhaust gases entering said exhaust aftertreatment device.

7. A method according to claim 1, further comprising the step of limiting said quantity of exhaust stream additive to be injected accounting for maximum exhaust stream additive storage capacity in each exhaust aftertreatment device.

8. A method according to claim 1, further comprising the step in which data from temperature sensors located in the exhaust line are used to adapt the engine control unit's exhaust aftertreatment system model.

9. A method according to claim 1, further comprising the step in which data from exhaust stream additive sensors located in the exhaust line are used to adapt the engine control unit's exhaust aftertreatment system model.

10. A method according to claim 1, further comprising the step in which data from $NO_x$ sensors located in said exhaust line are used to adapt said engine control unit's exhaust aftertreatment system model.

11. A method according to claim 1 further comprising the steps of:

computing desired exhaust stream additive ratio for at least one additional exhaust aftertreatment devices to achieve high exhaust system conversion efficiency;

computing the quantity of exhaust stream additive which must be injected from said exhaust stream additive supply into the exhaust stream entering said additional exhaust aftertreatment devices such that said desired exhaust stream additive ratio is attained;

decreasing said quantity of exhaust stream additive to supply to said additional exhaust aftertreatment devices to account for the reducing ability of feedgas constituents to said additional exhaust aftertreatment devices;

and commanding the additional exhaust stream additive injectors to supply said quantity of exhaust stream additive.

\* \* \* \* \*